United States Patent
Benichou

(12)
(10) Patent No.: US 6,220,077 B1
(45) Date of Patent: Apr. 24, 2001

(54) APPARATUS FOR CONTROLLING THE LEVEL OF A FLUID IN A TANK

(76) Inventor: Robert Benichou, 12, rue Michael Winburn, Courbevoie 92400 (FR)

(*) Notice: Subject to any disclaimer, the term of this patent is extended or adjusted under 35 U.S.C. 154(b) by 0 days.

(21) Appl. No.: 09/319,590

(22) PCT Filed: Dec. 9, 1997

(86) PCT No.: PCT/FR97/02244

§ 371 Date: Jul. 8, 1999

§ 102(e) Date: Jul. 8, 1999

(87) PCT Pub. No.: WO98/26258

PCT Pub. Date: Jun. 18, 1998

(30) Foreign Application Priority Data

Dec. 13, 1996 (FR) .................................................. 96 15331

(51) Int. Cl.$^7$ .............................................. G01F 23/00
(52) U.S. Cl. .......................................... 73/29.3; 73/290 R
(58) Field of Search ................................. 73/290 R, 293; 340/618, 619, 622; 250/357.1

(56) References Cited

U.S. PATENT DOCUMENTS

| | | | |
|---|---|---|---|
| 4,306,525 | * 12/1981 | Faxvog | 73/293 |
| 4,637,254 | * 1/1987 | Dyben et al. | 73/314 |
| 4,749,855 | * 6/1988 | Watanabe | 250/227 |
| 4,873,875 | 10/1989 | Coru . | |
| 5,311,283 | 5/1994 | Heeschen . | |
| 5,689,290 | * 11/1997 | Saito et al. | 73/293 |

FOREIGN PATENT DOCUMENTS

| | | |
|---|---|---|
| 2655154 | 5/1991 | (FR) . |
| 58-072126 | 4/1983 | (JP) . |
| 1221496 | 3/1986 | (SU) . |

* cited by examiner

Primary Examiner—Robert Raevis
Assistant Examiner—Katina M. Wilson
(74) Attorney, Agent, or Firm—R. Plottel

(57) ABSTRACT

The invention concerns an apparatus for controlling the level of a fluid in a tank. Apparatus in which the rotatory effect that can be produced by certain substances on a polarized radiation is used for level detecting in the tanks which contain them. A beam of incident rays derived from the source, s passes successively through (horizontal arrow) the two polarizers $p_1$ and $p_2$ separated by the space S. The signal received in the receiver, r at the output of the second polarizer $P_2$ indicates the presence of the fluid F in the space, S and the level to be controlled in the tank R. The invention is particularly applicable for controlling the level of fuel in the tanks of all kinds of vehicles, in particular aeroplanes.

3 Claims, 2 Drawing Sheets

APPARATUS FOR CONTROLLING THE LEVEL OF A FLUID IN A TANK

The present invention relates to a device for controlling the level of a fluid in a tank.

The device delivers information when the fluid level crosses a given threshold in the tank. In another of its versions, the device of the invention delivers a plurality of successive items of information for various thresholds, and then controls in stages the amount of fluid contained in the tank. The fluid may be a liquid or a gas; the device according to the invention relates to both cases, even though, to give an idea, a liquid may be referred to below by way of example.

In many situations, it is desirable to be warned when the level of fluid contained in a tank falls below a certain limit; this is the case, for example, with air transport such as airplanes or helicopters, for which it is desirable to minimize the fuel load for a given mission.

A large number of solutions to this problem have been proposed in the past, and the number of level controlling devices currently in use is large; these are of very diverse type, including mechanical, electromechanical, etc. They are widely established in a variety of fields. They will not be described further here.

The invention uses for this purpose the rotatory polarization effect which the fluid to be controlled, in terms of its level, can exert on polarized incident radiation. The radiation in question is electromagnetic radiation in its broad sense. A source delivers the incident radiation, which is subjected to the action of a first polarizer, then to that of a second polarizer, or analyzer, which is separated from the first by a space which is entered by the fluid during variations of its level in the tank. Because of the rotatory effect in question, the radiation collected at the output of the second polarizer depends on the amount of fluid between the polarizers, in this space, and gives information in particular about the presence of the fluid at the level to be controlled, using various methods which are all contained in the invention even though they are not expressly described.

The same is true regarding the corresponding signal, which can be derived from this radiation. This signal depends amongst other things on the orientation of the polarizers.

The invention will be understood more clearly with reference to the following description and the appended figures in which, in each case schematically and without implying any limitation:

Figure 1:
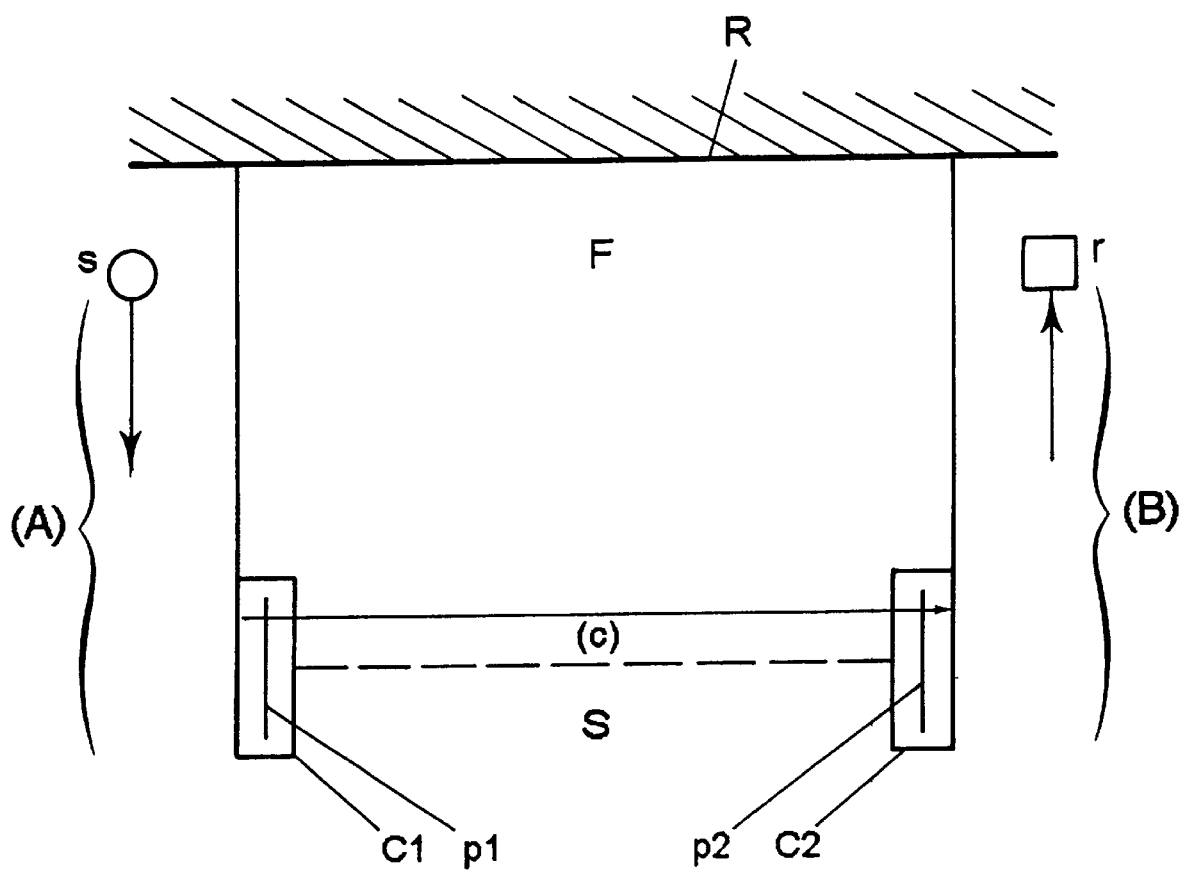
FIG. 1 represents a view of the device of the invention.

FIG. 1 shows a frame (hatching) relative to which the level of the fluid F moves when the amount of it in the tank varies. The frame may be the tank R itself, as is the case in the example of the figure; in the illustrative embodiment of this figure, two parts $C_1$ and $C_2$ have additionally been represented which are fixed with respect to the frame, and it has been assumed that the polarizers $p_1$ $p_2$ of a pair are each incorporated in one of these parts, which are used to support them. These parts face each other on a line (c) chosen in relation to the level to be controlled. A space S, which the fluid reaches when its level in the tank varies, separates the two polarizers. These parts are themselves integral components, as regards one of them $C_1$, of an input branch (A) comprising a radiation source s and means for generating a beam of incident rays directed toward the first polarizer $p_1$ (downward arrow) and, as regards the other of them $C_2$, of an output branch (B) comprising a receiver r, and means for deriving and transmitting to it (upward arrow) a signal on the basis of the radiation emerging from the second polarizer $p_2$. This radiation depends, all other things being equal, on the amount of fluid encountered by the incident radiation on its path (horizontal arrow), from one polarizer to the other and in the space S which separates them, and, above all, on whether or not the fluid is present in this space. The signal available in the receiver r therefore informs the observer about when the fluid reaches this space and the level to be controlled. The assembly which has been described thus controls a level of fluid in the tank.

Figure 2:
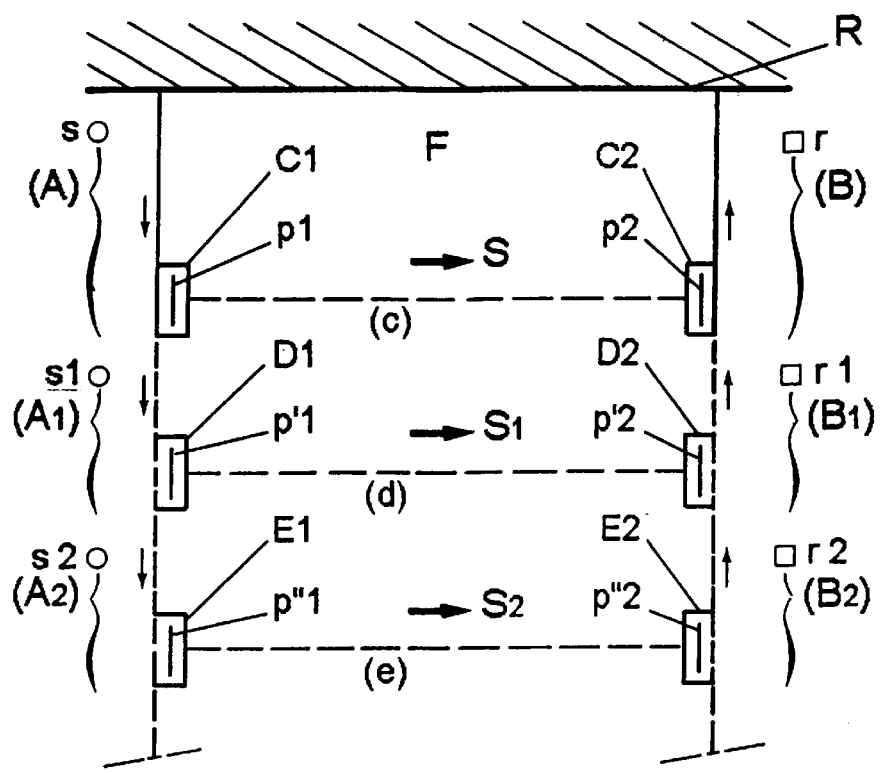
FIG. 2 represents a view of a variant of the device of the invention.

In a variant of the invention, which forms the subject of FIG. 2, the case of a plurality of levels to be controlled is represented. In this non-limiting example of the invention, limited to three assemblies, it has been assumed that the input branches, like the output branches, are all separated from one another, each with its own radiation source as regards the former, and each with its own receiver as regards the latter. The figure shows the elements corresponding to the various assemblies with their own references as $p'_1$ $p'_2$, $D_1$ $D_2$, (d), $S_1$ then as $P''_1$ $p''_2$, $E_1$ $E_2$, (e), $S_2$ and as $(A_1)$ $(A_2)$, $(B_1)$ $(B_2)$, the sources having the references s, $s_1$ $s_2$ and the receivers having the references r $r_1$ $r_2$, as well as some of the elements already represented in FIG. 1 with their references, namely $p_1$ $p_2$, $C_1$ $C_2$, (c) S and (A) and (B). In the scope of the invention, various other arrangements are possible in the case of this variant, with, for example, the same radiation source for a plurality of input branches, or the same receiver for a plurality of output branches, as well as any combination of these arrangements. All these arrangements are contained in the invention.

Figure 3:
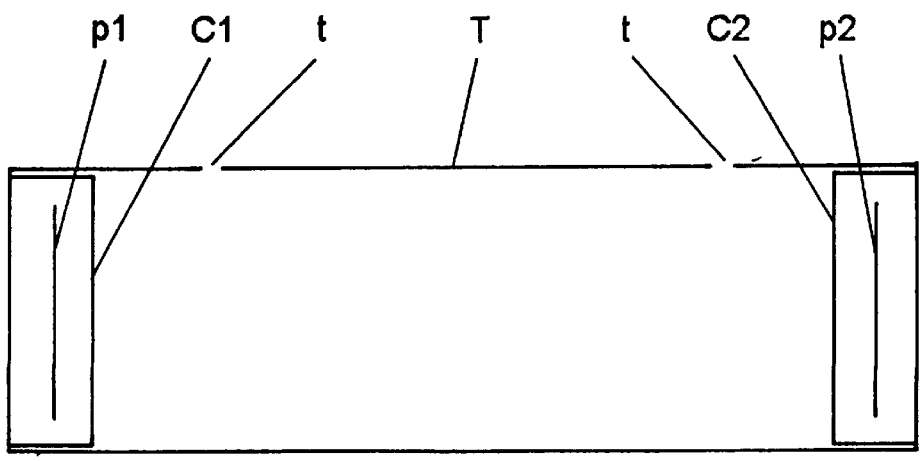
FIG. 3 Represents a view of an alternative embodiment of a part of the device of the invention.

In one variant of the invention, which is represented in FIG. 3, the parts $C_1$ and $C_2$ occupy the ends of a cylindrical straight tube, T made of metal, for example; this tube may itself be fixed to the tank; means are provided to establish communication between the outside and the inside of the tube, for example holes t drilled in its wall, in particular to allow a liquid to pass through.

Returning to the question of the orientation of the polarizers in a pair, orientation of the polarizers relative to one another and relative to the incident beam, it is to be pointed out that they are chosen, in particular, all other things being equal, according to the intensity of the radiation received by the second polarizer in the pair when these orientations vary, when the fluid is present at the level to be controlled, in particular.

A common application of the device of the invention consists in controlling the fuel level in all kinds of vehicles, in particular air transport.

What is claimed is:

1. Device for controlling the level of a fluid in a tank, characterized in that it has at least one assembly comprising an electromagnetic radiation source s, a pair of polarizers $p_1$ and $p_2$, which polarize this radiation, and are separated by a space S, which the fluid reaches when the level to be controlled is reached, said radiation, directed toward said first polarizer $p_1$ (downward arrow), passing successively through the first polarizer $p_1$, said space S, and the second polarizer $p_2$ (horizontal arrow), and a receiver r, to which a signal corresponding to the radiation emerging from the second polarizer $p_2$ is transmitted.

2. Device according to claim 1, characterized in that it comprises a plurality of said assemblies.

3. Device according to claim 1, characterized in that said polarizers are incorporated in parts $C_1$ $C_2$ occupying the ends of a tube T.

* * * * *